(12) United States Patent
Hesky

(10) Patent No.: US 6,217,211 B1
(45) Date of Patent: Apr. 17, 2001

(54) TEMPERATURE MEASURING AND MONITORING

(75) Inventor: Michael Hesky, Villmar (DE)

(73) Assignee: Michael Hesky GmbH (DE)

( * ) Notice: Subject to any disclaimer, the term of this patent is extended or adjusted under 35 U.S.C. 154(b) by 0 days.

(21) Appl. No.: 09/238,676

(22) Filed: Jan. 26, 1999

(30) Foreign Application Priority Data

Jan. 27, 1998 (EP) .................................................. 98101342

(51) Int. Cl.[7] ............................. G01N 25/72; G01K 3/14
(52) U.S. Cl. ............................. 374/4; 374/137; 374/184; 340/870.17
(58) Field of Search ............................. 374/4, 6, 7, 137, 374/183, 184; 340/870.17, 870.18, 588, 605

(56) References Cited

U.S. PATENT DOCUMENTS

| | | | |
|---|---|---|---|
| 3,413,840 | * 12/1968 | Basile et al. ........................... 73/40 |
| 4,422,066 | * 12/1983 | Belcourt et al. ...................... 374/142 |
| 4,441,107 | * 4/1984 | Chaborski et al. ............. 340/870.17 |
| 4,553,432 | * 11/1985 | Barlian et al. ........................ 374/142 |
| 4,816,748 | * 3/1989 | Tazawa et al. ....................... 374/183 |
| 4,861,168 | * 8/1989 | Ziegler et al. ........................ 374/184 |
| 4,874,252 | * 10/1989 | Ziegler et al. ........................ 374/184 |
| 4,878,226 | * 10/1989 | McQuoid et al. .................... 374/183 |
| 5,862,170 | * 1/1999 | Britton, Jr. et al. .................. 374/184 |
| 6,091,255 | * 7/2000 | Godfrey ................................ 374/184 |

FOREIGN PATENT DOCUMENTS

| | | | |
|---|---|---|---|
| 2236914 | * 3/1973 | (DE) ........................................ 374/4 |
| 0 060 552 A2 | 9/1982 | (EP) . |
| 0 073 322 A1 | 3/1983 | (EP) . |
| 30639 | * 3/1981 | (JP) ........................................ 374/4 |
| 71126 | * 3/1990 | (JP) .................................... 374/184 |
| 547651 | * 2/1977 | (SU) ................................... 374/184 |

\* cited by examiner

*Primary Examiner*—Diego Gutierrez
*Assistant Examiner*—Stanley J. Pruchnic, Jr.
(74) *Attorney, Agent, or Firm*—Reising, Ethington, Barnes, Kisselle, Learman & McCulloch, P.C.

(57) ABSTRACT

A temperature measuring and monitoring arrangement, in particular for leak detection on pipelines. A number of temperature sensors (30) are arranged in a distributed array along the item to be monitored and are connected to one or more computers (15, 19) by way of communication units (10) and at least one serial connecting line (11). The temperature sensors (30) have a measuring member and a reference member which are included as a frequency-determining member in a measuring oscillator and a reference oscillator respectively. The temperature can be corrected and in particular drifts can be substantially eliminated by suitable mathematical treatment of the frequency values. Anomalies in respect of temperature distribution can be interpreted as a leak in a pipeline.

12 Claims, 3 Drawing Sheets

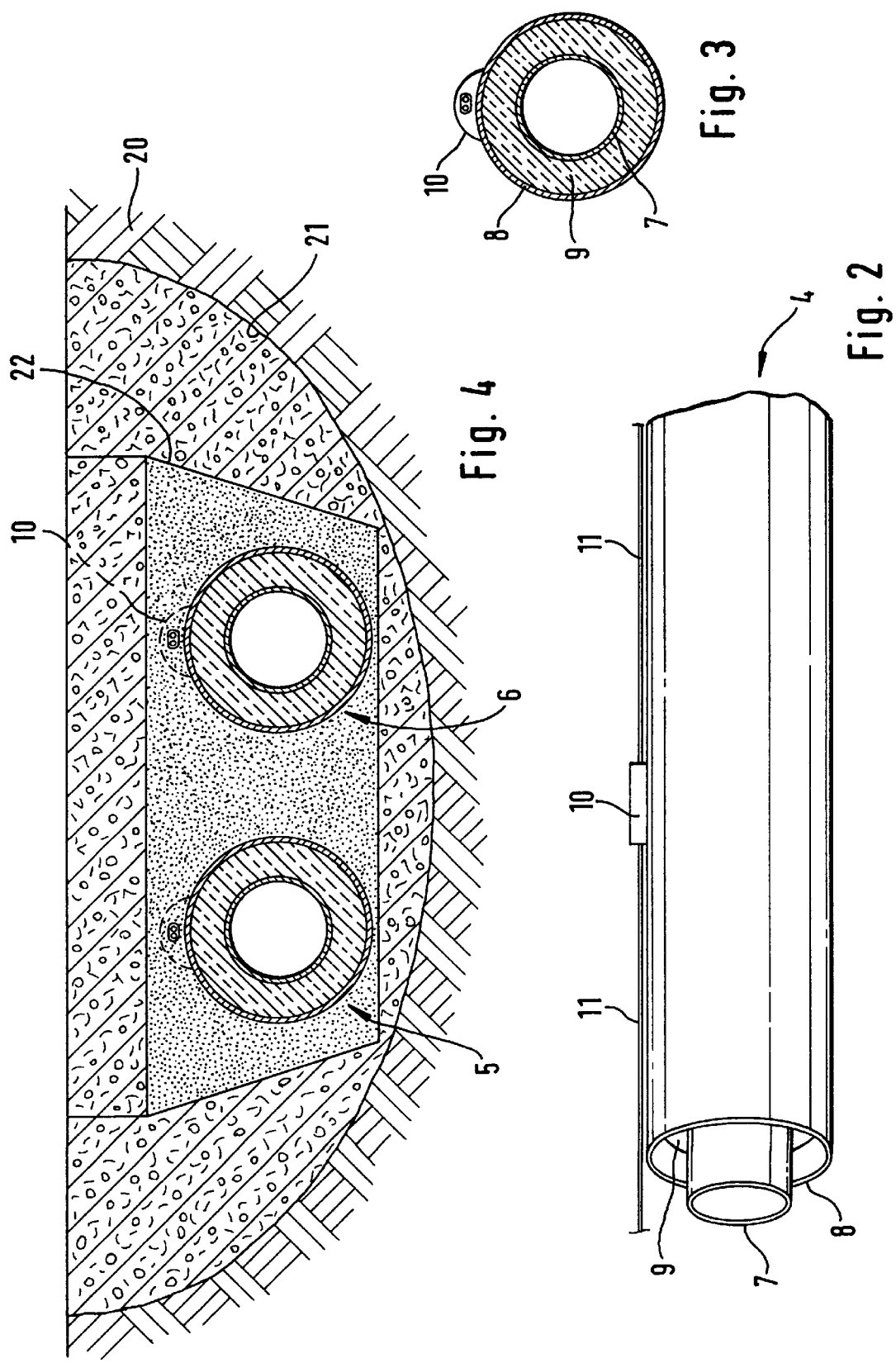

TEMPERATURE MEASURING AND MONITORING

FIELD OF THE INVENTION

The invention concerns a temperature measuring and monitoring system for leak detection on pipelines.

BACKGROUND OF THE INVENTION

There are many different methods for locating leaks in pipelines, including those methods which are based on the variation in temperature when leaks occur. In German patent application DE 30 49 544 A1 sensors in respect of temperature, moisture and radioactivity are arranged between the pipeline wall and the insulation and are connected to an analysis station by way of optical waveguides or fiber optics. Many sensors and accordingly many optical waveguides are needed in order to analyze propagation of the leakage. The handling of such optical waveguides in the ground gives rise to problems.

German patent application DE 195 09 129 A1 describes a further known method and apparatus for checking and monitoring the condition of pipes, containers, vessels, pipelines or the like, wherein local fluctuations in temperature are detected. This involves establishing the ambient temperature distribution over portions of the item to be monitored, and using an elongate temperature sensor for distributed temperature measurement. When a local anomaly is detected in the temperature distribution, it is concluded that there is a leak. For establishing the ambient temperature distribution, use is made of an optical-fiber sensor cable which is operated with laser light, and evaluation in respect of transit time and intensity of the backscattered laser light is implemented. That mode of temperature detection is subject to error sources which vary with time so that reliable evaluation over long periods of time becomes difficult.

SUMMARY OF THE INVENTION

It is an object of the present invention to provide a novel temperature measuring and monitoring system for leak detection in pipelines. It is a further object of the invention to keep drifts in temperature measurement at a low level or even to eliminate such drifts.

With the present invention, a number of temperature sensors are provided which each have a measuring member and a reference member. The measuring member is included as a frequency-determining member in a measuring oscillator which is of the RC- or LC-type and the reference member is included as a frequency-determining member in a similar RC- or LC- reference oscillator. Such oscillators have active components; which are disposed on a common carrier and are made up of similar materials or comprise materials which age in a similar manner. Associated with each sensor is a communication unit which has transmitting and receiving units in order to respond upon receipt of an associated address so as to interrogate the temperature sensor. In that situation the oscillator frequency of the reference oscillator and of the measuring oscillator is sent to an evaluation circuit which evaluates the measuring frequency to determine the temperature at the measuring member. A mathematical function including the measuring frequency and the reference frequency is used to correct the respective provisionally acquired temperature value and to substantially eliminate drifts in respect of temperature measurement.

In the case of extended items as pipelines and pipeline systems are, groups of temperature sensors and associated communication units are formed and are connected by way of a serial connecting line having two or three wires. Associated with each group is a group computer as an evaluation circuit for each serial connecting line and the group computer operates each temperature sensor with its address allocated thereto and interrogates it in order to compare temperature values obtained in that way to predetermined temperature values. In that fashion, anomalies in temperature distribution at the item to be monitored are detected.

BRIEF DESCRIPTION OF THE DRAWINGS

Further details of the invention are described with reference to the drawing in which:

FIG. 2 is a diagrammatic view of a pipeline portion with communication unit and temperature sensor, FIG. 3 is a view in section through the pipeline portion shown in FIG. 2, FIG. 4 is a view in section through buried pipelines.

DESCRIPTION OF THE PREFERRED EMBODIMENTS

Figure 1:
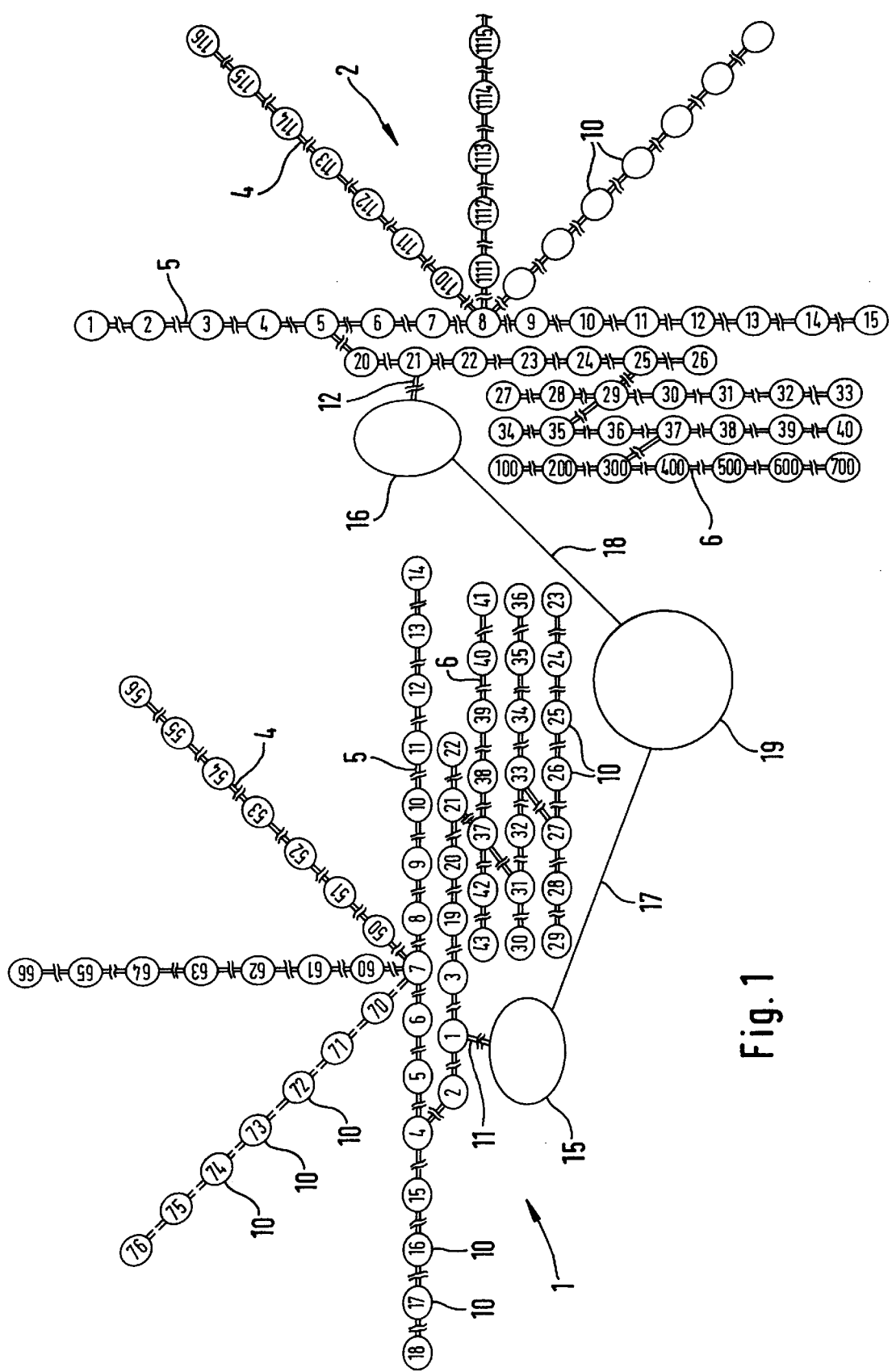
FIG. 1 is a diagrammatic view of a temperature measuring and monitoring system of a pipeline network.

Referring to FIG. 1, shown therein is a pipeline system with two groups of pipelines 1 and 2 which include individual pipeline sections 4, 5 and 6 which can be communicated with each other and which are to be monitored jointly in respect of leakages. For that purpose, disposed along each pipeline 4, 5 and 6 are temperature sensors and associated communication units 10 which are connected by way of a serial connecting line 11 and 12 respectively to an associated route or group computer 15 and 16 respectively. The group computers 15 and 16 communicate by way of suitable data lines, for example telephone lines 17 and 18, with a central computer 19. The serial connecting lines 11 and 12 comprise two or three wires and are laid along the respective pipelines 4, 5 and 6 and taken to the respective route or group computers 15 and 16.

FIG. 2 shows a portion of a pipeline 4 which includes an inner pipe 7, an outer pipe 8 and an insulating sheathing 9 disposed therebetween. A communication unit 10 is carried an the outer pipe 8 or is disposed in the proximity thereof. Theserial connecting line 11 leads to further communciation units on the pipe, as indicated in FIG. 1. Usually, leakages occur in the proximity of the connecting locations between individual pipes, and for that reason the communication units 10 are disposed in the proximity of such locations which may comprise a polyethylene coupling sleeve or socket (FIG. 3).

FIG. 4 shows the configuration of two parallel pipelines 5, 6 in the ground 20. Normally, a trench 21 is dug, in which the lines 5, 6 are laid and enclosed with sand or the like filling material 22. The communication unit 10 is disposed at a protected location on the pipeline, for example at the upper apex point of a coupling sleeve or socket.

Figure 5:
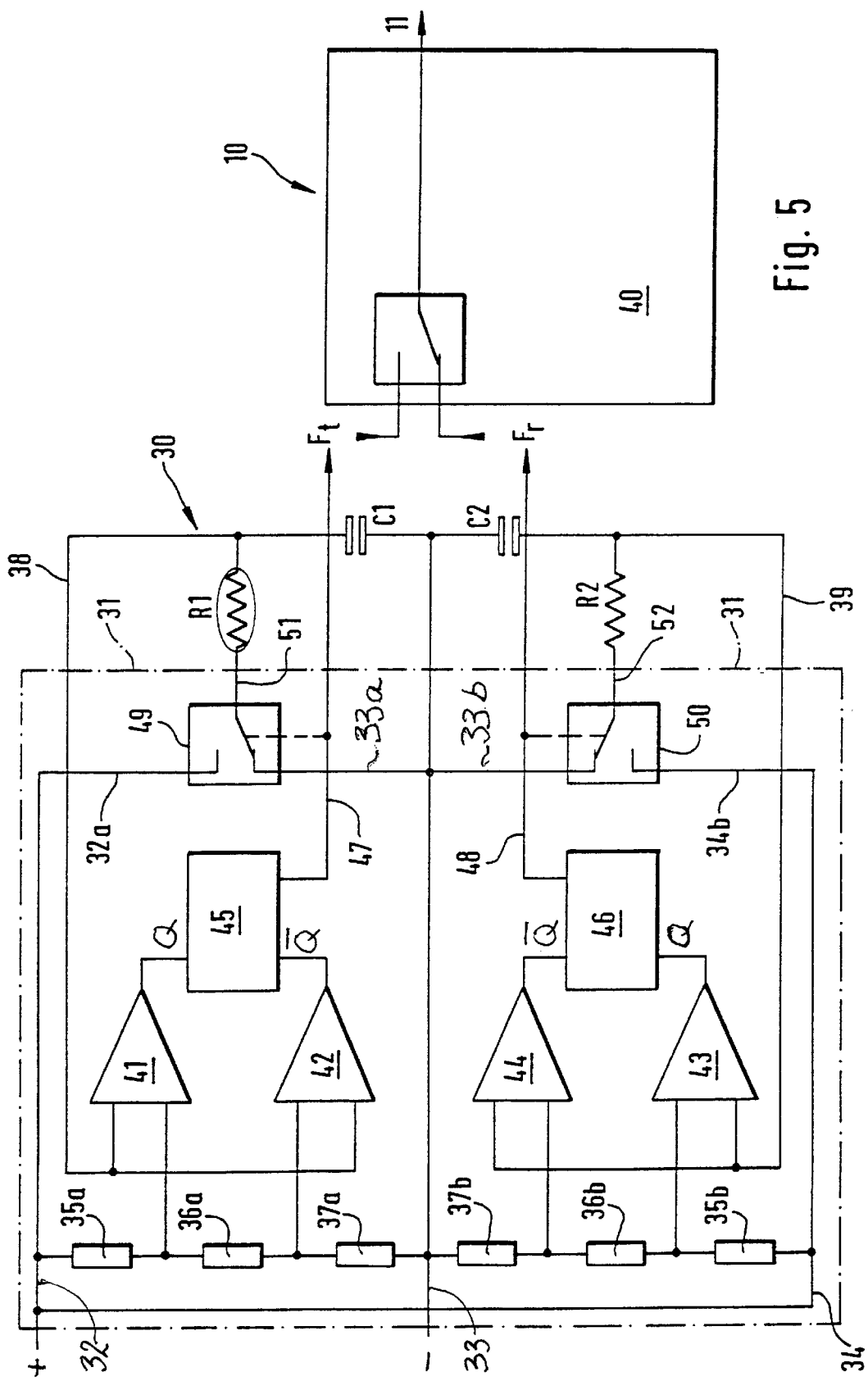
FIG. 5 is a diagrammatic view of a communication unit, and connected to a block circuit diagram of the temperature sensor.

FIG. 5 shows one temperature sensor 30 and the communication unit 10 associated thereto, i. e. arranged adjacent to one another, as indicated in FIG. 2, in the same casing. The communication unit 10 includes an addressing logic 40 which is connected by way of the serial connecting line 11 (or 12) to an associated computer 15 (or 16). Addressing logics are known per se and do not need to be described in greater detail herein. The function thereof is to evaluate addressing data arriving an the line 11 (or 12), that is to say to respond or not to respond, and, in the event of responding, to produce switching operations in the temperature sensor 30, that is to say to connect same to the power supply and to switch the frequency signals $F_t$, $F_r$ on to the line 11 (or 12).

The temperature sensor 30 comprises a chip 31 and two resistors R1 and R2 in series with capacitors C1 and C2. A supply voltage Ub of for example 15 V is fed on a line 32 and a line 33 serves for the current return. Within the chip 31, the line 32 has a branching 34. Extending between the lines 32, 34 and 33 respectively are two voltage dividers formed by resistors 35a, 36a, 37a and 35b, 36b, 37b respectively so that ⅔ Ub and ⅓ Ub can be tapped off at those voltage dividers. The tapped-off voltages are fed to a series of comparators 41, 42, 43, 44 which each have two inputs, wherein the first inputs are connected to the above-mentioned tappings of the voltage dividers while the second inputs are connected by way of lines 38 and 39 respectively to the capacitors C1 and C2 respectively. The comparators 41, 42 are connected at their outputs to the inputs Q and $\overline{Q}$ of a bistable multivibrator 45 and the comparators 43 and 44 are connected at their outputs to Q and $\overline{Q}$ of a bistable multivibrator 46. The multivibrators 45 and 46 each have a respective output line 47 and 48 which can be connected by way of the addressing logic 40 to the serial connecting line 11. The multivibrator 45 controls an electronic switch 49 and the multivibrator 46 controls an electronic switch 50, which switches are each in the form of single-pole change-over switches. The connecting lines of the electronic switch 49 are identified by 32a, 33a and 51 while those of the electronic switch 50 are identified by 33b, 34b and 52. The capacitor C1 is either connected by way of the resistor R1 and the switch 49 to supply voltage Ub and is charged up, or the capacitor is discharged in the switch position illustrated. The same applies in regard to the capacitor C2, the resistor R2 and the switch 50. When the capacitor Cl charges and reaches ⅔ Ub voltage, the comparator 41 switches the multivibrator 45 into the 'low' state, whereupon the electronic switch 49 assumes the illustrated position in which the capacitor C1 discharges by way of the resistor R1. When ⅓ Ub voltage is reached the comparator 42 responds and switches the multivibrator to 'high', whereby in turn the electronic switch 49 is switched over and the capacitor C1 is; charged by way of the resistor R1 and the lines 51, 32a, 32. When the voltage at the capacitor C1 again reaches ⅔ Ub, that is detected at the comparator 41 and the multivibrator 45 again goes into the 'low' state. That procedure is continuously repeated and produces a frequency signal $F_t$ on the line 47, which depends on the instantaneous resistance value of the resistor R1. The lower the resistor R1 is, the correspondingly higher is the frequency $F_t$.

The capacitor C2, the resistor R2, the switch 50, the comparators 43, 44 and the bistable multivibrator 46 co-operate in the same manner as described in respect of the components C1, R1, 49, 41, 42, 45 so that a frequency signal Fr is also produced at the output line 48, that frequency signal being characteristic in respect of the resistance value of the resistor R2. The resistor R2 is produced from a metal-film resistor with the lowest possible temperature coefficient so that the frequency $F_r$ which is tapped off at the line 48 remains fairly constant and can be used as a reference frequency. The resistor R1 is a temperature-dependent resistor and the signal $F_t$ is a temperature-dependent frequency. There are resistors with a positive temperature coefficient, for example a platinum resistor or a silicon PTC resistor, and there are resistors with a negative temperature coefficient, for example with an NTC resistor. Both kinds of resistors are suitable. The temperature sensor 30 is distinguished in that, as a result of the supply voltage division by means of the voltage dividers 35a, 36a, 37a and 35b, 36b and 37b respectively, fluctuations in the supply voltage Ub do not have any falsifying influence on temperature detection as such error sources cancel each other out or can be compensated from the measuring frequency and the reference frequency. While an RC-member has been used in the oscillator circuit as the frequency-determining member, it is also possible to use an LC-member in the oscillator as the frequency-determining member. In addition it is also possible to use a quartz crystal with a special ground plane, in the gase of which the TC-reversal point is far outside the temperature range to be measured. The ground quartz crystal is used in place of the RC- or LC-member in the respective oscillator. In both of the oscillators, the temperature/frequency characteristic is selected in different linear regions. It should be noted that, the resonance frequency of the quartz crystal depends only oil its mechanical dimensions- Those dimensions alter with temperature and thus the resonance frequency also alters therewith.

What is claimed is:

1. A temperature measuring and monitoring system for leak detection on pipeline sections, comprising a number of communication units arranged on said pipeline sections at points to be monitored;

each communication unit having an address for being remotely addressed;

an evaluation unit for addressing each communication unit;

a number of temperature sensors which each have a measuring member and a reference member;

the measuring member being a frequency-determining member in a measuring oscillator and the reference member being a frequency-determining member in a reference oscillator;

the measuring oscillator and the reference oscillator having active components which are disposed on a common carrier and which are made up of materials that age in the same or a similar manner;

each communication unit being associated with a said temperature sensor and having transmitting and receiving devices for responding upon the receipt of its address and to interrogate the temperature sensor associated thereto, wherein the reference oscillator and the measuring oscillator of each temperature sensor are connected to said transmitting device of said communication unit to send their respective oscillator frequency ($F_t$, $F_r$) to said evaluation unit; and said evaluation unit being adapted to determine a provisional temperature at the measuring member based on the measuring frequency ($F_t$) received, said evaluation unit also comprising correcting means which incorporate a mathematical function for calculating a corrected temperature value, based on said provisional temperature and said measuring frequency ($F_t$) and said reference frequency ($F_r$) so as to substantially eliminate drifts in the temperature measurement.

2. The temperature measuring and monitoring system according to claim 1 wherein said temperature sensors and said associated communication units form groups on said pipeline sections to be monitored;

each group of said temperature sensors and associated communication units being connected through a serial connecting line having at least two wires to said evaluation unit;

said evaluation unit being configured as a group computer for each serial connecting line so as to actuate and interrogate each addressed temperature sensor and compare the actual acquired temperature value thereof to a predetermined temperature value which is a temperature to be expected at the point to be monitored, in order to detect normality or unusualness of the respective actual temperature value.

3. The temperature measuring and monitoring system according to claim 2 wherein means are provided to calculate said predetermined temperature value from average values of measurements over all temperature sensors of the group so as to take account of climatically induced fluctuations in temperature in the measurement environment of said pipeline sections.

4. The temperature measuring and monitoring system according to claim 2 wherein two group computers are connected to a central computer which is adapted to evaluate and store the measurement data from the group computers.

5. The temperature measuring and monitoring system according to claim 1 wherein said pipeline sections each comprise an inner pipe and an outer pipe, said temperature sensors being disposed at or in the proximity of said outer pipe.

6. The temperature measuring and monitoring system according to claim 1 wherein said temperature sensors are disposed on sockets which connect adjacent pipeline sections.

7. The temperature measuring and monitoring system according to claim 1 wherein said common carrier of said measuring oscillator and said reference oscillator is an IC-chip.

8. The temperature measuring and monitoring system according to claim 7 wherein said frequency determining member is a platinum resistor.

9. The temperature measuring and monitoring system according to claim 7 wherein said frequency determining member is a silicon component with a positive temperature coefficient.

10. The temperature measuring and monitoring system according to claim 7 wherein said frequency detecting member is a silicon component with a negative temperature coefficient.

11. The temperature measuring and monitoring system according to claim 7 wherein said frequency determining member is a quartz crystal having a ground plane so disposed that a reversal point in characterization is far outside the temperature range to be measured.

12. The temperature measuring and monitoring system according to claim 1 also including supply voltage means to said measuring oscillator and said reference oscillator, said supply voltage means comprising a first voltage divider for providing first divided voltages ($\frac{1}{3}$ Ub; $\frac{2}{3}$ Ub) and a second voltage divider for providing second divided voltages ($\frac{1}{3}$ Ub; $\frac{2}{3}$ Ub), said first and second divided voltages showing equal ratios.

* * * * *